(12) United States Patent
Goddu et al.

(10) Patent No.: US 12,461,931 B2
(45) Date of Patent: Nov. 4, 2025

(54) VALIDATING CODE FOR AN EXTRACT, TRANSFORM, AND LOAD PROCESS

(71) Applicant: Capital One Services, LLC, McLean, VA (US)

(72) Inventors: Shreya Goddu, Long Island, NY (US); Arunadevi Ashok Inamdar, Ashburn, VA (US); Thomas Barry, New York, NY (US); Justin David Good, Richmond, VA (US); Swaroop Appu Koman, Scotch Plains, NJ (US); Mesfin Mulugeta Dinku, Vienna, VA (US); Sean Bourke, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 18/494,290

(22) Filed: Oct. 25, 2023

(65) Prior Publication Data

US 2025/0139114 A1 May 1, 2025

(51) Int. Cl.
*G06F 16/25* (2019.01)
(52) U.S. Cl.
CPC .................................. *G06F 16/254* (2019.01)
(58) Field of Classification Search
CPC .................................................... G06F 16/254
See application file for complete search history.

(56) References Cited

U.S. PATENT DOCUMENTS

| 11,243,989 | B1 * | 2/2022 | Flanagan | G06F 40/253 |
| 2015/0169712 | A1 * | 6/2015 | Bhide | G06F 16/254 |
| | | | | 707/602 |
| 2019/0196890 | A1 * | 6/2019 | Bucchi | G06F 16/951 |
| 2021/0200744 | A1 * | 7/2021 | Gubba | G06F 16/258 |
| 2021/0264195 | A1 * | 8/2021 | Ingram | G06F 16/5866 |

OTHER PUBLICATIONS

"The Fastest Way to Build and Deploy Data Pipelines for Machine Learning." 14 pages, retrieved Oct. 23, 2023, available at https://www.tecton.ai/product/.

* cited by examiner

*Primary Examiner* — Courtney Harmon
(74) *Attorney, Agent, or Firm* — Harrity & Harrity, LLP

(57) ABSTRACT

In some implementations, a device may receive a request to validate code defining a feature for compliance with a feature authoring library. The code may configure one or more phases of an extract, transform, and load (ETL) process associated with obtaining data for the feature. The device may identify one or more standards for assessing whether an initialization or an execution of the one or more phases of the ETL process is indicative of the code complying with the feature authoring library. The device may determine whether the initialization or the execution of the one or more phases of the ETL process satisfies the one or more standards. The device may transmit, based on whether the initialization or the execution of the one or more phases of the ETL process satisfies the one or more standards, a response indicating whether the code complies with the feature authoring library.

20 Claims, 8 Drawing Sheets

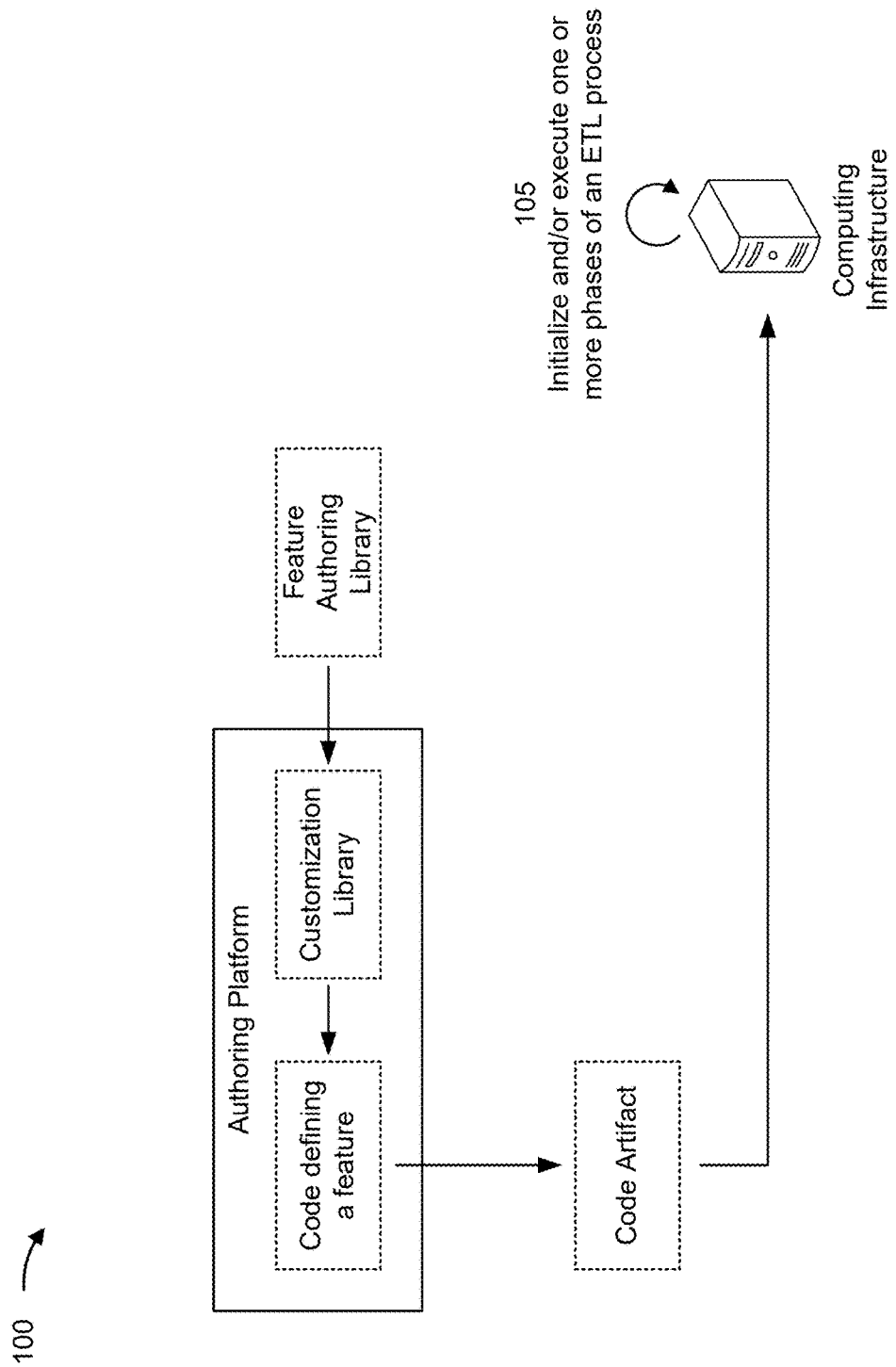

VALIDATING CODE FOR AN EXTRACT, TRANSFORM, AND LOAD PROCESS

BACKGROUND

In computing, extract, transform, and load (ETL) generally refers to procedures to copy data from one or more source systems into one or more destination (or sink) systems that represent the data in a different manner and/or in a different context than the source system(s). For example, in an ETL system, extraction typically includes importing structured and/or unstructured data from homogeneous or heterogeneous data sources, transformation includes processing and converting the data (e.g., using a data cleansing technique) into a format and/or structure that is suitable for querying and further analysis, and loading includes inserting the transformed data into a final target system, such as an operational data store, a data mart, or a data warehouse. Accordingly, an ETL system may be used to deliver data in a format to enable developers to build applications around the data and/or enable end users to consume or otherwise utilize the data.

SUMMARY

Some implementations described herein relate to a system for validating code. The system may include one or more memories and one or more processors communicatively coupled to the one or more memories. The one or more processors may be configured to receive a request to validate code defining a feature for compliance with a feature authoring library. The code may configure one or more phases of an extract, transform, and load (ETL) process associated with obtaining data for the feature. The feature authoring library may include a set of definitions relating to the ETL process. The feature authoring library may be extendible by a customization library associated with a platform used to author the code. The one or more processors may be configured to identify one or more standards, relating to the set of definitions of the feature authoring library, for assessing whether an initialization or an execution of the one or more phases of the ETL process is indicative of the code complying with the feature authoring library. The one or more processors may be configured to determine whether the initialization or the execution of the one or more phases of the ETL process satisfies the one or more standards. The one or more processors may be configured to transmit, based on whether the initialization or the execution of the one or more phases of the ETL process satisfies the one or more standards, a response indicating whether the code complies with the feature authoring library.

Some implementations described herein relate to a method of validating code. The method may include receiving, by a device, a request to validate code defining a feature for compliance with a feature authoring library. The code may configure one or more phases of an ETL process associated with obtaining data for the feature. The method may include identifying, by the device, one or more standards for assessing whether an initialization or an execution of the one or more phases of the ETL process is indicative of the code complying with the feature authoring library. The method may include determining, by the device, whether the initialization or the execution of the one or more phases of the ETL process satisfies the one or more standards. The method may include transmitting, by the device and based on whether the initialization or the execution of the one or more phases of the ETL process satisfies the one or more standards, a response indicating whether the code complies with the feature authoring library.

Some implementations described herein relate to a non-transitory computer-readable medium that stores a set of instructions for validating code. The set of instructions, when executed by one or more processors of a device, may cause the device to determine whether an initialization or an execution of one or more phases of an ETL process satisfies one or more standards for assessing whether the initialization or the execution of the one or more phases of the ETL process is indicative of code complying with a feature authoring library. The code may configure the one or more phases of the ETL process in connection with obtaining data for a feature. The set of instructions, when executed by one or more processors of the device, may cause the device to transmit, based on whether the initialization or the execution of the one or more phases of the ETL process satisfies the one or more standards, an indication of whether the code complies with the feature authoring library.

BRIEF DESCRIPTION OF THE DRAWINGS

FIGS. 1A-1E are diagrams of an example associated with validating code for an extract, transform, and load (ETL) process, in accordance with some embodiments of the present disclosure.

DETAILED DESCRIPTION

Figure 1B:
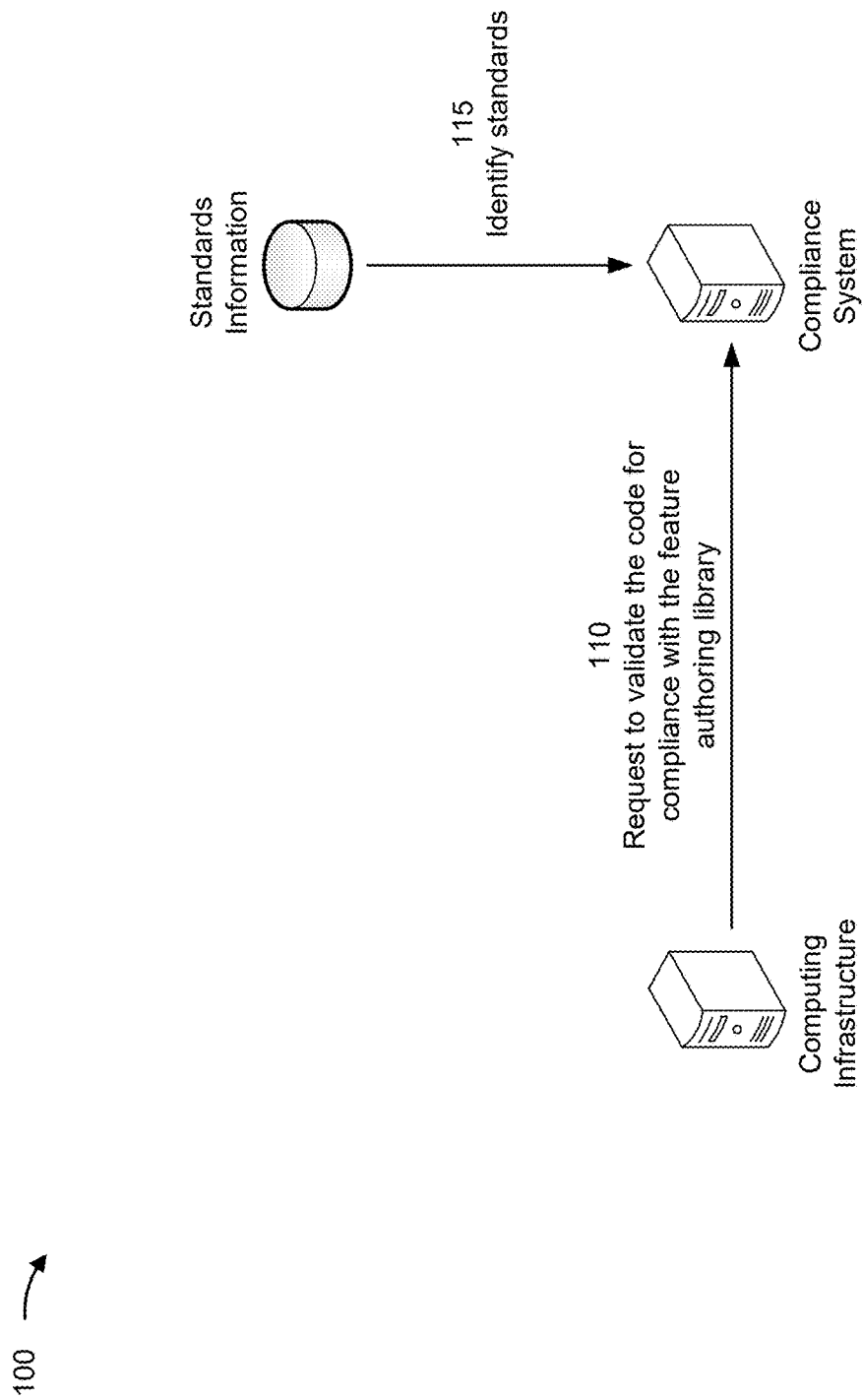

The following detailed description of example implementations refers to the accompanying drawings. The same reference numbers in different drawings may identify the same or similar elements.

An extract, transform, and load (ETL) process may include gathering data from one or more (often heterogeneous) data sources and consolidating the data into a single, centralized location. For example, an ETL process may include extracting raw structured data and/or raw unstructured data from various data sources (e.g., databases, cloud and/or on-premises environments, data warehouses, customer relationship management systems, and/or other sources), transforming the raw data into a format compatible with a destination system (e.g., using data cleansing, standardization, deduplication, verification, sorting, and/or other techniques), and then loading the transformed data to the destination system for further use.

In data science and engineering, an ETL process can be applied to a feature (sometimes referred to as a "variable" or an "attribute"). A feature may refer to a measurable piece of data that can be used for downstream analysis, such as in a machine learning model or a statistical model to make predictions, to make classifications, or to gain insights from data. One or more phases of an ETL process associated with a feature may be governed by code authored by a user (e.g., a data scientist). For example, the user may author the code for the feature using a feature-authoring platform, and then the code may be run on shared computing infrastructure (e.g., computing infrastructure used by multiple users) to execute the ETL process.

Many feature-authoring platforms are available, and thus code authored for various features may be non-standardized. Furthermore, running non-standardized code on shared computing infrastructure has the potential to produce negative system-wide effects. For example, the code may have characteristics that could destabilize or crash the computing infrastructure, thereby leading to significant downtime of the computing infrastructure and/or leading to significant computing resources (e.g., processor resources or memory resources) being expended to redeploy the computing infrastructure. Moreover, the code may have characteristics that exploit vulnerabilities of the computing infrastructure (e.g., whether intentionally or unintentionally), thereby compromising a security of the computing infrastructure and/or exposing secure areas or resources of the computing infrastructure to potentially malicious activities.

Some implementations described herein enable code defining features to be standardized, so that the code, which may be authored in non-similar ways and/or using different authoring platforms, can be executed on a single computing infrastructure. In some implementations, a feature authoring library may provide a basic framework for executing an ETL process for a feature that is portable across platforms and infrastructures. For example, code in compliance with the feature authoring library should be executable on the computing infrastructure without causing issues. The feature authoring library may be extendible by a customization library that is specific to an authoring platform. The customization library may enhance the feature authoring library with customizations that simplify authoring code for features.

In some implementations, a compliance system may be used to validate that code defining a feature, which can be authored using customizations as allowed by the feature authoring library, is in compliance with the feature authoring library (e.g., and therefore suitable for execution on the single computing infrastructure). Rather than validating the code defining the feature itself, the compliance system may analyze an initialization and/or an execution of an ETL process, associated with obtaining data for the feature, to determine whether the initialization and/or the execution of the ETL process are indicative of the code defining the feature complying with the feature authoring library. For example, the compliance system may apply a set of standards to inputs and/or outputs of the initialization and/or the execution of the ETL process to determine whether the initialization and/or the execution of the ETL process are indicative of the code defining the feature complying with the feature authoring library.

By validating that the code defining the feature complies with the feature authoring library, the code can be successfully and securely executed on the single computing infrastructure. In this way, the computing infrastructure may be more stable and experience less downtime, and computing resources that would have otherwise been used to redeploy the computing infrastructure following a crash can be conserved. Furthermore, a security of the computing infrastructure may be improved, thereby reducing incidents that expose secure areas or resources of the computing infrastructure.

FIGS. 1A-1E are diagrams of an example 100 associated with validating code for an ETL process. As shown in FIGS. 1A-1E, example 100 includes a compliance system, a computing infrastructure, and a reference device. These devices are described in more detail in connection with FIGS. 2 and 3.

The computing infrastructure may be associated with an entity that permits multiple users to author code defining features to be run on the computing infrastructure. Thus, the computing infrastructure may be a shared computing infrastructure among the multiple users (e.g., code authored by any of the users can be run on the computing infrastructure). The computing infrastructure may provide processing and/or storage capabilities in connection with running the code. The computing infrastructure may include physical infrastructure, virtual infrastructure, serverless infrastructure, or the like.

The users may use one or more authoring platforms (e.g., software applications) to author the code. For example, the users may use multiple authoring platforms to author the code, and each of the authoring platforms may provide different functionality. Furthermore, each of the authoring platforms may utilize a respective customization library (e.g., a software development kit (SDK)) that may extend (e.g., add customizations to) a feature authoring library (e.g., an installable package) that is common to the multiple authoring platforms.

The feature authoring library includes a set of definitions (e.g., one or more classes) relating to an ETL process. The set of definitions enable code defining a feature to be successfully run on the computing infrastructure. The set of definitions may include a definition of a feature (e.g., defining an extract phase for a feature, a transform phase for a feature, and/or validation rules for a feature, among other examples). Additionally, or alternatively, the set of definitions may include a definition of metadata for a feature and/or a definition of a data source to be used for obtaining data for a feature. Moreover, the feature authoring library may define one or more methods (e.g., hooks) for initialization and/or execution of an ETL process. For example, the feature authoring library may include a method (e.g., a hook) for initialization of the ETL process (e.g., loading a feature) and/or a method (e.g., a hook) for executing an extract phase and/or a transform phase of the ETL process. The customization library (e.g., a separate package from the feature authoring library) may provide customization to how a feature can be described, authored, or executed.

In this way, the feature author library provides a basic framework that is portable across platforms and infrastructures, while a customization library of a platform enhances the feature authoring library with customizations that simplify authoring code for features. For example, the feature authoring library may specify base declarations that can be used or extended by the customization library, as well as method interfaces (e.g., callable when a feature is executed) that may be extended by the customization library as hooks. Thus, code defining features can be authored in non-similar ways using different dependencies, but converted according to a single standard to enable the code to be run on a single computing infrastructure.

The compliance system may be configured to validate whether code defining a feature, which can be authored using customizations as allowed by the feature authoring library (e.g., thereby allowing features to be authored in ways that defy expectations), is within the expectations of a feature as set forth in the feature authoring library. The compliance system may be implemented in the computing infrastructure or may be implemented in separate computing infrastructure. In some implementations, the compliance system and the computing infrastructure (whether implemented together or separately) may be components of a system associated with the entity.

As shown in FIG. 1A, and by reference number 105, the computing infrastructure may initialize and/or execute one or more phases of an ETL process. For example, the computing infrastructure may initialize and/or execute the one or more phases of the ETL process based on a code artifact (e.g., a binary, a library, or a module). The code artifact may be based on code defining a feature that was authored by a user using an authoring platform (e.g., the code artifact may be a result of a build of the code). The code defining the feature may be based on a customization library (e.g., an SDK), associated with the authoring platform, that is based on the feature authoring library (e.g., which is non-specific to the platform). For example, the code may use one or more customizations, of the feature authoring library, that are defined in the customization library. Accordingly, the code artifact may have dependencies on artifacts for the customization library and the feature authoring library. In some implementations, the computing infrastructure may receive the code artifact (e.g., in connection with an input from the user). In some implementations, the computing infrastructure may retrieve the code artifact (e.g., from a repository or a storage location) based on receiving (e.g., in connection with an input from the user) a metadata file indicating a location of the code artifact.

The ETL process may be associated with obtaining data for the feature (e.g., the code defining the feature may indicate how to obtain data for the feature from raw data). To initialize and/or execute the one or more phases of the ETL process, the computing infrastructure may extract the feature from the code artifact (e.g., by calling a method associated with initialization of the ETL process), may initialize the ETL process based on the feature, may execute an extract phase of the ETL process (e.g., by calling a method associated with execution of the ETL process), may execute a transform phase of the ETL process, and/or may execute a load phase of the ETL process. The code defining the feature may configure the one or more phases of the ETL process (e.g., indicating how to obtain data for the feature). For example, the code defining the feature may configure the transform phase of the ETL process.

In some implementations, the execution of the one or more phases of the ETL process may be a test execution used for compliance checking. Alternatively, the execution of the one or more phases of the ETL process may be a production execution. For example, the ETL process may execute according to a schedule (e.g., daily execution, weekly execution, or the like), and each execution, or a subset thereof, may be subjected to compliance checking.

As shown in FIG. 1B, and by reference number 110, the computing infrastructure may transmit, and the compliance system may receive, a request to validate the code defining the feature for compliance with the feature authoring library. In some implementations, the request may be from a device separate from the computing infrastructure. In some implementations, the request may be via an application programming interface (API). For example, the compliance system may implement a service for feature code validation that is exposed via the API.

In some implementations, the request to validate the code defining the feature may be a request to validate the code at an initialization of the ETL process (e.g., before an extract phase of the ETL process). In some implementations, the request to validate the code defining the feature may be a request to validate the code during the execution of the ETL process (e.g., after an extract phase of the ETL process and/or after a transform phase of the ETL process, but prior to completion of the ETL process). In some implementations, the request to validate the code defining the feature may be a request to validate the code after execution of the ETL process (e.g., after a load phase of the ETL process is completed). The request may indicate a point in time of the ETL process at which the code is to be validated, and/or a timing at which the compliance system receives the request may indicate when the code is to be validated (e.g., on-demand validation).

As shown by reference number 115, the compliance system may identify one or more standards for assessing whether the initialization and/or the execution of the one or more phases of the ETL process are indicative of the code defining the feature complying with the feature authoring library. For example, the standards, rather than being used to validate the code itself, can be used to identify whether the initialization and/or the execution of the one or more phases of the ETL process have inputs and/or outputs that are indicative of the code defining the feature complying with the feature authoring library (e.g., if the code did not comply with the feature authoring library then the expected inputs and/or outputs would be absent). As shown, the compliance system may obtain standards information, indicating one or more standards, from a data structure, such as a database (e.g., the standards may be configured for the compliance system). Additionally, or alternatively, one or more standards may be indicated in the request received by the compliance system. For example, the standards may be changed from time to time.

In some implementations, the compliance system may determine one or more standards based on the feature authoring library. For example, the compliance system may process the feature authoring library (e.g., to interpret the feature authoring library), and the compliance system may determine one or more standards based on the processing of the feature authoring library. As an example, the compliance system may process the feature authoring library using a machine learning model. The machine learning model may be a generative model (e.g., a recurrent neural network, a transformer, or the like) trained to output one or more standards based on an input of the feature authoring library. In this way, the standards can be adaptive to changes to the feature authoring library.

As described further below, the standards may relate to data governance, metadata, data lineage, data security, testing, and/or logging. Moreover, the standards may relate to the set of definitions of the feature authoring library. For example, the initialization and/or the execution of the one or more phases of the ETL process satisfying a standard may indicate that the code defining the feature complies with a definition, or portion thereof, of the set of definitions. As an example, a definition of the feature authoring library may indicate that the execution of an ETL process is to generate particular log data, and a standard may assess whether the log data was generated (e.g., the log data being generated indicates compliance with the feature authoring library, and the log data not being generated indicates noncompliance with the feature authoring library).

Figure 1C:
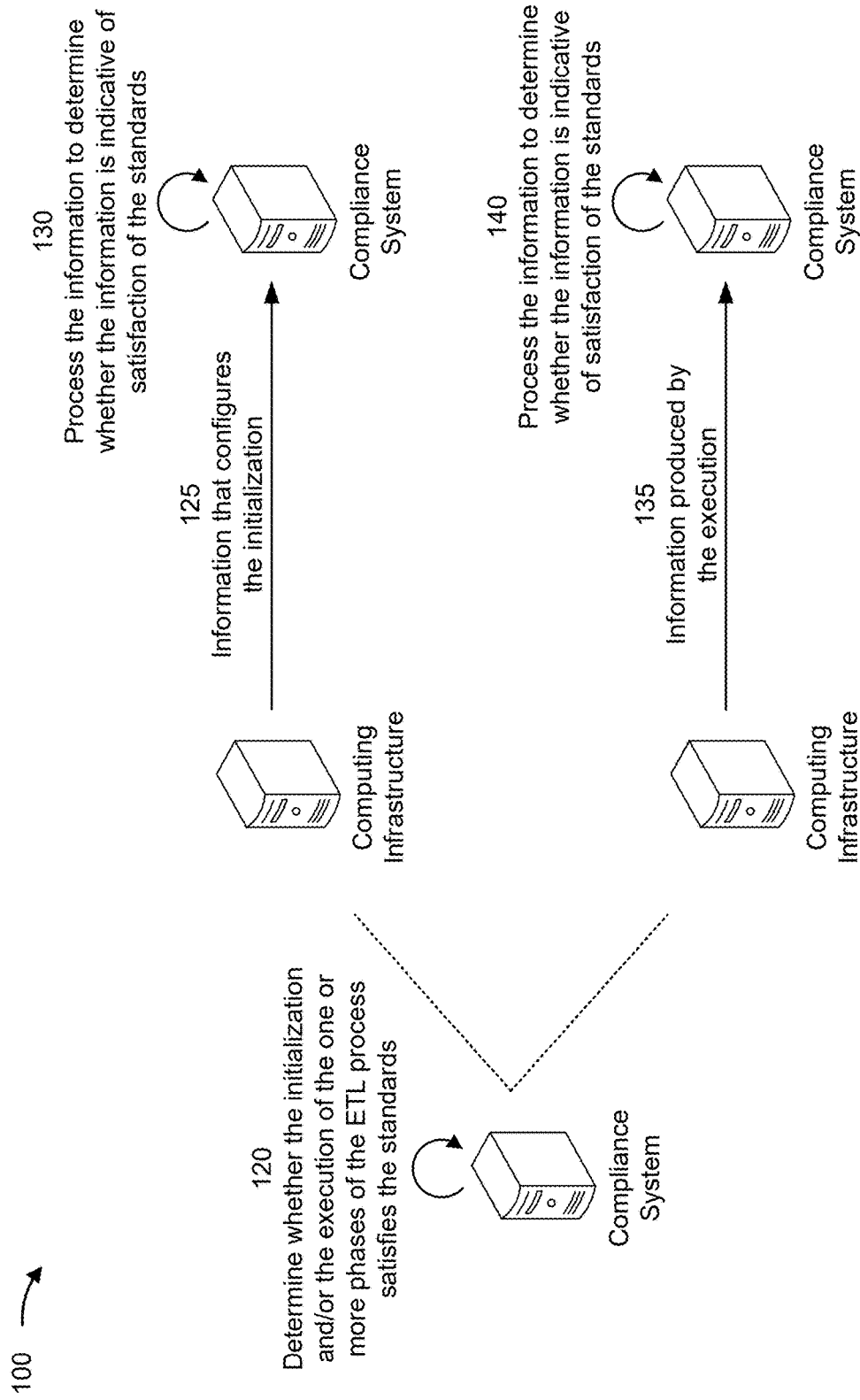

As shown in FIG. 1C, and by reference number 120, the compliance system may determine whether the initialization and/or the execution of the one or more phases of the ETL process satisfy the one or more standards. For example, the compliance system may obtain information relating to the initialization and/or the execution of the one or more phases of the ETL process (e.g., information generated in connection with the one or more phases of the ETL process), and the compliance system may determine whether the information is indicative of satisfaction of the standards. As another example, the compliance system may check that documents, logs, files, data, metadata, or the like, that are supposed to be generated in connection with the initialization and/or the execution of the one or more phases of the ETL process, have actually been generated, thereby indicating satisfaction of the standards.

As shown by reference number 125, to determine whether the initialization and/or the execution of the one or more phases of the ETL process satisfy the one or more standards, the compliance system may obtain information that configures the initialization of the one or more phases of the ETL process. For example, the computing infrastructure may transmit, and the compliance system may receive, the information. In some implementations, the information may be included in the request received by the compliance system.

As an example, the information may be a configuration, such as metadata, prepared by the user and relating to the ETL process (e.g., the metadata file described above). For example, the configuration may indicate whether the feature is associated with personally identifiable information or confidential information, may indicate a data store where the data associated with the feature will be published, or the like. A standard may indicate that a configuration must include an indication of whether a feature is associated with personally identifiable information or confidential information, or a standard may indicate that a configuration must include an indication of a data store where data is to be published. Accordingly, as shown by reference number 130, the compliance system may process the information to determine whether the information is indicative of satisfaction of the standards (e.g., the compliance system may apply the standards to the information). For example, the compliance system may parse the information, extract data from the information, or the like, to identify whether the information includes one or more indications required by the standards.

As shown by reference number 135, to determine whether the initialization and/or the execution of the one or more phases of the ETL process satisfy the one or more standards, the compliance system may obtain information generated by the execution of the one or more phases of the ETL process. For example, the computing infrastructure may transmit, and the compliance system may receive, the information. As another example, the information may be generated in one or more data stores, one or more databases, one or more files (e.g., log files), or the like, and the compliance system may retrieve the information. In some implementations, the information may be included in the request received by the compliance system.

As an example, the information may indicate one or more data sources used by the ETL process, may indicate one or more data stores used by the ETL process, may indicate one or more libraries, classes, functions, or methods utilized by the ETL process, may indicate a quantity of records returned by the ETL process, may indicate a content and/or a schema of logs and/or metadata generated by the ETL process, and/or may indicate whether validation of data obtained by the ETL process was performed. A standard may indicate that a data source or a data store used by the ETL process must match a data source or a data store configured (e.g., by metadata, as described above) for use by the ETL process. A standard may indicate one or more libraries, classes, functions, or methods that must be used in the ETL process or that cannot be used in the ETL process. For example, the standard may indicate that the feature authoring library must be used (e.g., called) in the execution of the one or more phases of the ETL process. A standard may indicate that a quantity of records used in a first phase of the ETL process and in a second phase of the ETL process must match. A standard may indicate that logs and/or metadata generated by the ETL process must include particular content or a particular type of content, and/or that a schema of the logs and/or the metadata must include particular fields. A standard may indicate that data validation must be performed and/or one or more types of data validation that must be performed. Accordingly, as shown by reference number 140, the compliance system may process the information to determine whether the information is indicative of satisfaction of the standards (e.g., the compliance system may apply the standards to the information), in a similar manner as described above.

Figure 1D:
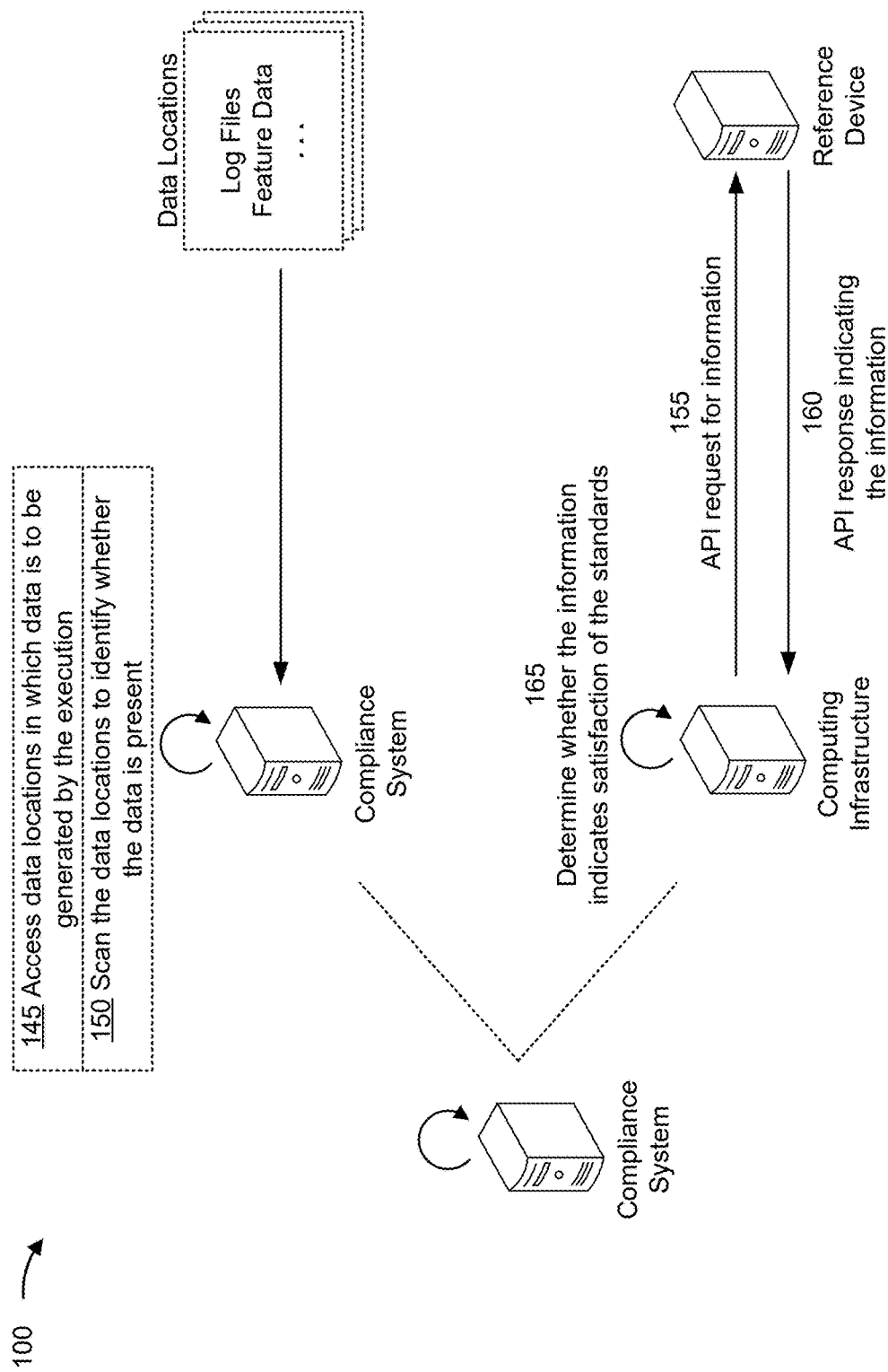

As shown in FIG. 1D, and by reference number 145, to determine whether the initialization and/or the execution of the one or more phases of the ETL process satisfy the one or more standards, the compliance system may access one or more data locations in which output data is to be generated by the execution of the one or more phases of the ETL process. For example, the ETL process may generate output data, such as logs, metadata, the data for the feature, or the like. The one or more data locations in which the output data is to be generated may include one or more data stores, one or more databases, or the like. The compliance system may access a data location by retrieving the contents of the data location or a list of the contents of the data location, by transmitting a request to the data location, by providing credentials for the data location, by establishing a connection to the data location, or the like.

A standard may indicate that a particular type of output data must be present in one or more particular data locations. A standard may indicate that a schema of a data location must include particular fields. Accordingly, as shown by reference number 150, the compliance system may scan the one or more data locations to identify whether the output data is present in the one or more data locations. For example, the output data being present may indicate satisfaction of the one or more standards. Additionally, or alternatively, the compliance system may scan the one or more data locations to identify whether schemas of the one or more data locations include particular fields. For example, a schema including one or more particular fields may indicate satisfaction of the one or more standards.

As shown by reference number 155, to determine whether the initialization and/or the execution of the one or more phases of the ETL process satisfy the one or more standards, the compliance system may transmit an API request for information relating to the initialization and/or the execution of the one or more phases of the ETL process. For example, the compliance system may transmit the request to the reference device. The reference device may be associated with a third-party service, such as code quality check service. As shown by reference number 160, the compliance system may receive, from the reference device, an API response indicating the information. As an example, the information may indicate a test coverage percentage associated with a code quality check of the code defining the feature. A standard may indicate that a test coverage percentage associated with code must satisfy a threshold (e.g., 80%). As shown by reference number 165, the compliance system may determine whether the information indicates satisfaction of the one or more standards. For example, the information indicating a test coverage percentage that satisfies the threshold may indicate satisfaction of the one or more standards.

Figure 1E:
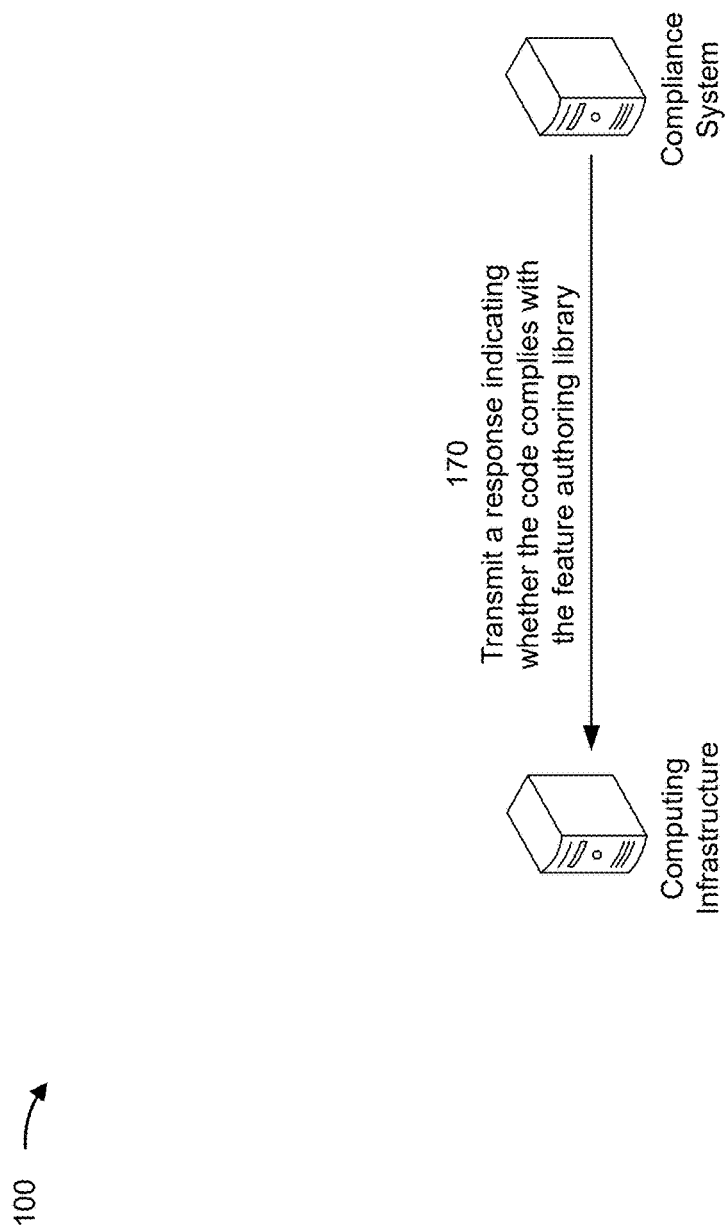

As shown in FIG. 1E, and by reference number 170, the compliance system may transmit, and the computing infrastructure may receive, a response indicating whether the code defining the feature complies with the feature authoring library. In some implementations, the response may be transmitted to a device separate from the computing infrastructure. In some implementations, the response may be via an API, as described above in connection with reference number 110.

The response may be based on whether the initialization and/or the execution of the one or more phases of the ETL process satisfies the one or more standards. As an example, the initialization and/or the execution of the one or more phases of the ETL process satisfying all of the standards (e.g., all of the standards that are identified by the compliance system) may indicate that the code defining the feature complies with the feature authoring library. The response may be a binary value, such as a value representing "pass" or "fail."

The compliance system and/or the computing infrastructure may perform one or more actions based on whether the code defining the feature complies with the feature authoring library. For example, based on the code not complying with the feature authoring library, the compliance system and/or the computing infrastructure may cause the code and/or the code artifact to be deleted or moved to a quarantine location. Additionally, or alternatively, the compliance system and/or the computing infrastructure may transmit a notification of noncompliance for the user that authored the code defining the feature. The notification may indicate one or more standards that were not satisfied by the initialization and/or the execution of the one or more phases of the ETL process. As another example, based on the code complying with the feature authoring library, the compliance system and/or the computing infrastructure may cause the code and/or the code artifact to be moved to a production environment, to be placed in a queue for execution, to be scheduled for execution, or the like.

By validating that the code defining the feature complies with the feature authoring library, the code can be successfully and securely executed on the computing infrastructure. In this way, the computing infrastructure may be more stable and experience less downtime, and computing resources that would have otherwise been used to redeploy the computing infrastructure following a crash can be conserved. Furthermore, a security of the computing infrastructure may be improved, thereby reducing incidents that expose secure areas or resources of the computing infrastructure.

As indicated above, FIGS. 1A-1E are provided as an example. Other examples may differ from what is described with regard to FIGS. 1A-1E.

Figure 2:
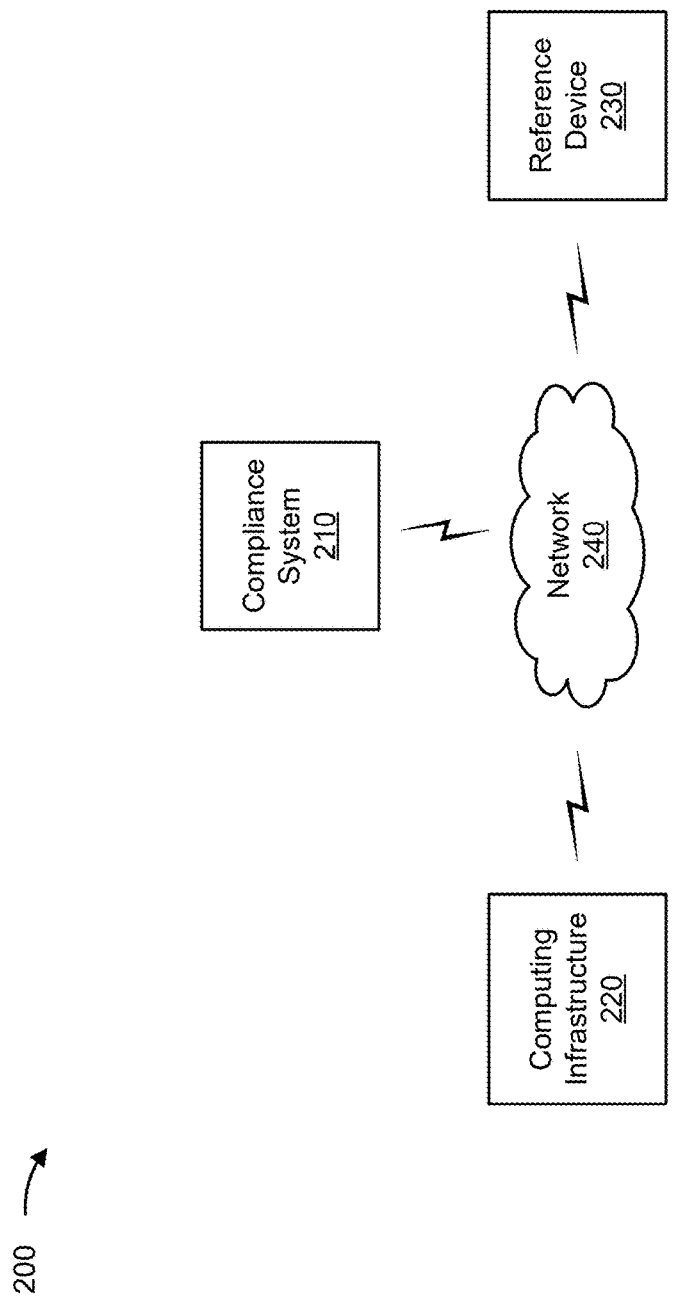
FIG. 2 is a diagram of an example environment in which systems and/or methods described herein may be implemented, in accordance with some embodiments of the present disclosure.

FIG. 2 is a diagram of an example environment 200 in which systems and/or methods described herein may be implemented. As shown in FIG. 2, environment 200 may include a compliance system 210, a computing infrastructure 220, a reference device 230, and/or a network 240. Devices of environment 200 may interconnect via wired connections, wireless connections, or a combination of wired and wireless connections.

The compliance system 210 may include one or more devices capable of receiving, generating, storing, processing, providing, and/or routing information associated with validating code for an ETL process, as described elsewhere herein. The compliance system 210 may include a communication device and/or a computing device. For example, the compliance system 210 may include a server, such as an application server, a client server, a web server, a database server, a host server, a proxy server, a virtual server (e.g., executing on computing hardware), or a server in a cloud computing system. In some implementations, the compliance system 210 may include computing hardware used in a cloud computing environment.

The computing infrastructure 220 may include one or more devices capable of receiving, generating, storing, processing, providing, and/or routing information associated with validating code for an ETL process, as described elsewhere herein. The computing infrastructure 220 may include a communication device and/or a computing device. For example, the computing infrastructure 220 may include a server, such as an application server, a client server, a web server, a database server, a host server, a proxy server, a virtual server (e.g., executing on computing hardware), or a server in a cloud computing system. In some implementations, the computing infrastructure 220 may include computing hardware used in a cloud computing environment. Additionally, or alternatively, the computing infrastructure may include a data structure, a database, a data source, a serverless computing function, a load balancer (e.g., a virtual load), and/or a volume (e.g., a virtual disk), among other examples. In some implementations, the computing infrastructure 220 may include the compliance system 210.

The reference device 230 may include one or more devices capable of receiving, generating, storing, processing, providing, and/or routing information associated with initialization or execution of one or more phases of an ETL process, as described elsewhere herein. The reference device 230 may include a communication device and/or a computing device. For example, the reference device 230 may include a server, such as an application server, a client server, a web server, a database server, a host server, a proxy server, a virtual server (e.g., executing on computing hardware), or a server in a cloud computing system. In some implementations, the reference device 230 may include computing hardware used in a cloud computing environment.

The network 240 may include one or more wired and/or wireless networks. For example, the network 240 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 240 enables communication among the devices of environment 200.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
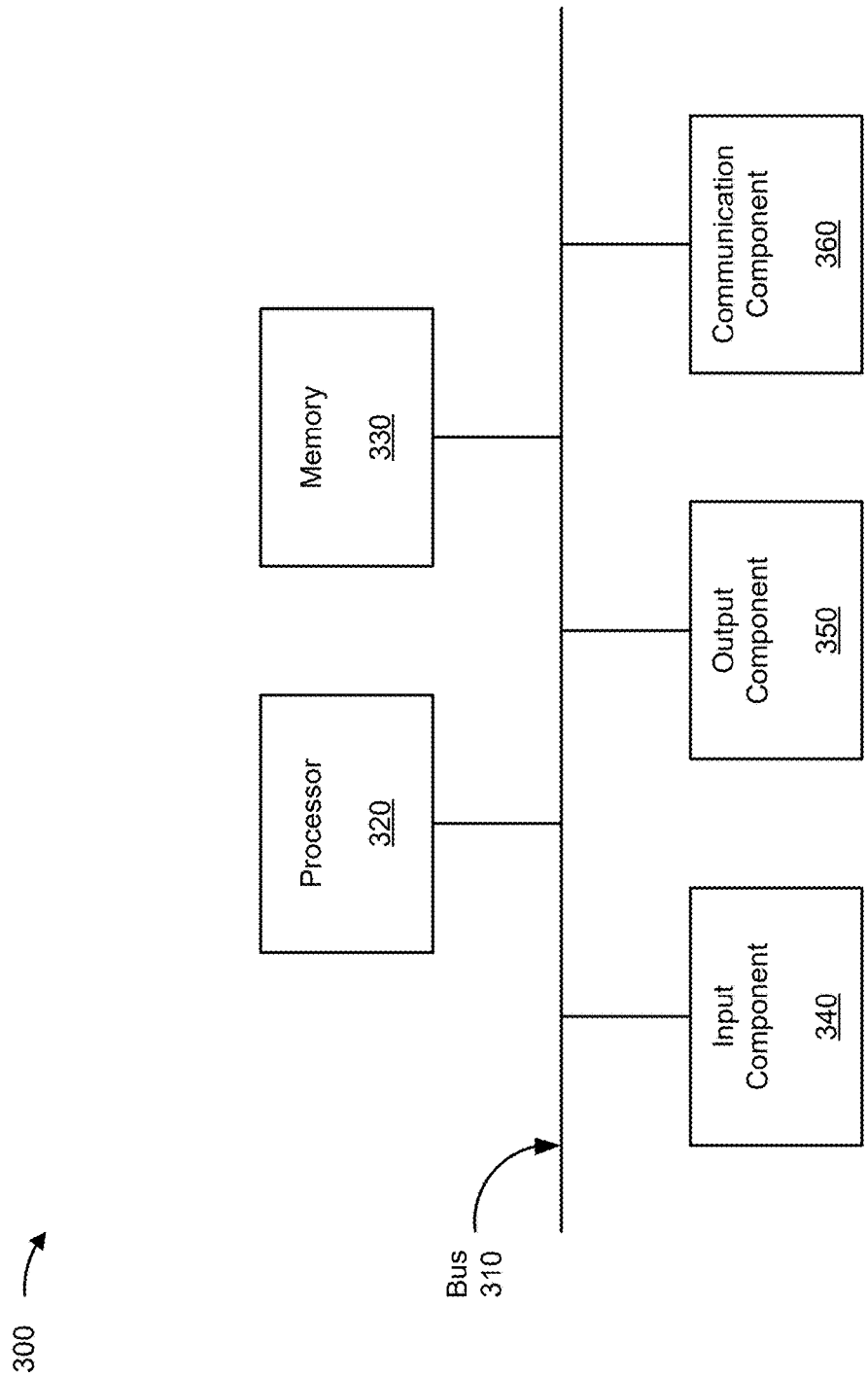
FIG. 3 is a diagram of example components of a device associated with validating code for an ETL process, in accordance with some embodiments of the present disclosure.

FIG. 3 is a diagram of example components of a device 300 associated with validating code for an ETL process. The device 300 may correspond to compliance system 210, computing infrastructure 220, and/or reference device 230. In some implementations, compliance system 210, computing infrastructure 220, and/or reference device 230 may include one or more devices 300 and/or one or more components of the device 300. As shown in FIG. 3, the device 300 may include a bus 310, a processor 320, a memory 330, an input component 340, an output component 350, and/or a communication component 360.

The bus 310 may include one or more components that enable wired and/or wireless communication among the components of the device 300. The bus 310 may couple together two or more components of FIG. 3, such as via operative coupling, communicative coupling, electronic coupling, and/or electric coupling. For example, the bus 310 may include an electrical connection (e.g., a wire, a trace, and/or a lead) and/or a wireless bus. The processor 320 may include a central processing unit, a graphics processing unit, a microprocessor, a controller, a microcontroller, a digital signal processor, a field-programmable gate array, an application-specific integrated circuit, and/or another type of processing component. The processor 320 may be implemented in hardware, firmware, or a combination of hardware and software. In some implementations, the processor 320 may include one or more processors capable of being programmed to perform one or more operations or processes described elsewhere herein.

The memory 330 may include volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. The memory 330 may store information, one or more instructions, and/or software (e.g., one or more software applications) related to the operation of the device 300. In some implementations, the memory 330 may include one or more memories that are coupled (e.g., communicatively coupled) to one or more processors (e.g., processor 320), such as via the bus 310. Communicative coupling between a processor 320 and a memory 330 may enable the processor 320 to read and/or process information stored in the memory 330 and/or to store information in the memory 330.

The input component 340 may enable the device 300 to receive input, such as user input and/or sensed input. For example, the input component 340 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 350 may enable the device 300 to provide output, such as via a display, a speaker, and/or a light-emitting diode. The communication component 360 may enable the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
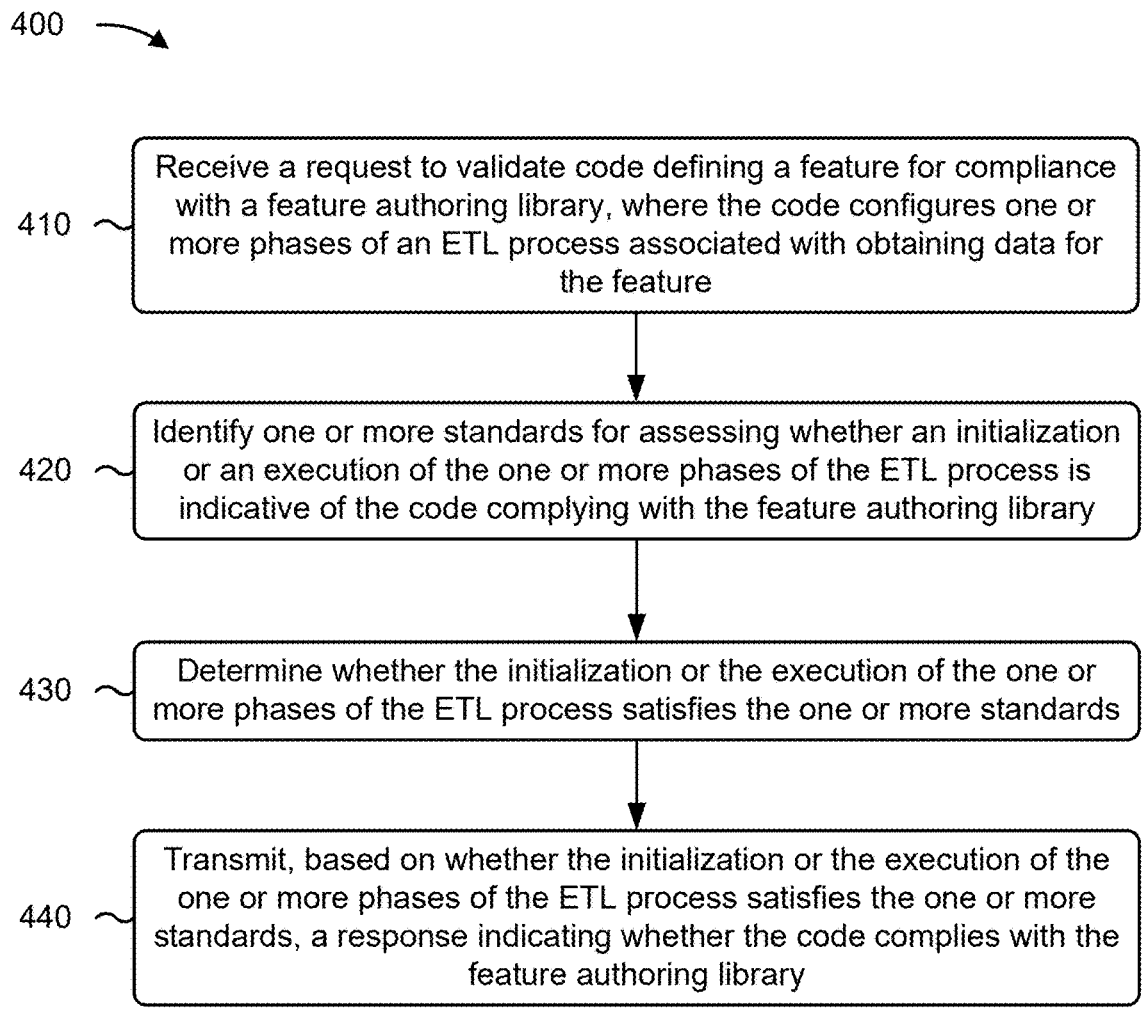
FIG. 4 is a flowchart of an example process associated with validating code for an ETL process, in accordance with some embodiments of the present disclosure.

FIG. 4 is a flowchart of an example process 400 associated with validating code for an ETL process. In some implementations, one or more process blocks of FIG. 4 may be performed by the compliance system 210. In some implementations, one or more process blocks of FIG. 4 may be performed by another device or a group of devices separate from or including the compliance system 210, such as the computing infrastructure 220 and/or the reference device 230. Additionally, or alternatively, one or more process blocks of FIG. 4 may be performed by one or more components of the device 300, such as processor 320, memory 330, input component 340, output component 350, and/or communication component 360.

As shown in FIG. 4, process 400 may include receiving a request to validate code defining a feature for compliance with a feature authoring library, where the code configures one or more phases of an ETL process associated with obtaining data for the feature (block 410). For example, the compliance system 210 (e.g., using processor 320, memory 330, input component 340, and/or communication component 360) may receive a request to validate code defining a feature for compliance with a feature authoring library, as described above in connection with reference number 110 of FIG. 1B. As an example, computing infrastructure that is to initialize and/or execute the ETL process may transmit the request.

As further shown in FIG. 4, process 400 may include identifying one or more standards for assessing whether an initialization or an execution of the one or more phases of the ETL process is indicative of the code complying with the feature authoring library (block 420). For example, the compliance system 210 (e.g., using processor 320, memory 330, input component 340, and/or communication component 360) may identify one or more standards for assessing whether an initialization or an execution of the one or more phases of the ETL process is indicative of the code complying with the feature authoring library, as described above in connection with reference number 115 of FIG. 1B. As an example, standards information, indicating the one or more standards, may be obtained from a data structure, such as a database. The standards, rather than being used to validate the code itself, can be used to identify whether the initialization and/or the execution of the one or more phases of the ETL process have inputs and/or outputs that are indicative of the code complying with the feature authoring library As further shown in FIG. 4, process 400 may include determining whether the initialization or the execution of the one or more phases of the ETL process satisfies the one or more standards (block 430). For example, the compliance system 210 (e.g., using processor 320 and/or memory 330, input component 340, and/or communication component 360) may determine whether the initialization or the execution of the one or more phases of the ETL process satisfies the one or more standards, as described above in connection with reference number 120 of FIG. 1C. As an example, the compliance system 210 may obtain information relating to the initialization and/or the execution of the one or more phases of the ETL process (e.g., information generated in connection with the one or more phases of the ETL process), and the compliance system 210 may determine whether the information is indicative of satisfaction of the standards. As another example, the compliance system 210 may check that documents, logs, files, data, metadata, or the like, that are supposed to be generated in connection with the initialization and/or the execution of the one or more phases of the ETL process, have actually been generated, thereby indicating satisfaction of the standards.

As further shown in FIG. 4, process 400 may include transmitting, based on whether the initialization or the execution of the one or more phases of the ETL process satisfies the one or more standards, a response indicating whether the code complies with the feature authoring library (block 440). For example, the compliance system 210 (e.g., using processor 320, memory 330, and/or communication component 360) may transmit, based on whether the initialization or the execution of the one or more phases of the ETL process satisfies the one or more standards, a response indicating whether the code complies with the feature authoring library, as described above in connection with reference number 170 of FIG. 1E. As an example, the response may be transmitted to the computing infrastructure that made the request.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel. The process 400 is an example of one process that may be performed by one or more devices described herein. These one or more devices may perform one or more other processes based on operations described herein, such as the operations described in connection with FIGS. 1A-1E. Moreover, while the process 400 has been described in relation to the devices and components of the preceding figures, the process 400 can be performed using alternative, additional, or fewer devices and/or components. Thus, the process 400 is not limited to being performed with the example devices, components, hardware, and software explicitly enumerated in the preceding figures.

The foregoing disclosure provides illustration and description, but is not intended to be exhaustive or to limit the implementations to the precise forms disclosed. Modifications may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The hardware and/or software code described herein for implementing aspects of the disclosure should not be construed as limiting the scope of the disclosure. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Although particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination and permutation of those items, including single members. As an example, "at least one of: a, b, or c" is intended to cover a, b, c, a–b, a–c, b–c, and a–b–c, as well as any combination with multiple of the same item. As used herein, the term "and/or" used to connect items in a list refers to any combination and any permutation of those items, including single members (e.g., an individual item in the list). As an example, "a, b, and/or c" is intended to cover a, b, c, a–b, a–c, b–c, and a–b–c.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors configured to: perform X; perform Y; and perform Z," that claim should be interpreted to mean "one or more processors configured to perform X; one or more (possibly different) processors configured to perform Y; and one or more (also possibly different) processors configured to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for validating code, the system comprising:
one or more memories; and
one or more processors, communicatively coupled to the one or more memories, configured to:
receive a request to validate code defining a feature for compliance with a feature authoring library,
wherein the code configures one or more phases of an extract, transform, and load (ETL) process associated with obtaining data for the feature,
wherein the feature authoring library includes a set of definitions relating to the ETL process, and
wherein the feature authoring library is extendible by a customization library associated with a platform used to author the code;
identify one or more standards, relating to the set of definitions of the feature authoring library, for assessing whether an initialization or an execution of the one or more phases of the ETL process is indicative of the code complying with the feature authoring library;
determine whether the initialization or the execution of the one or more phases of the ETL process satisfies the one or more standards,
wherein the determination comprises:
accessing one or more data locations where output data from executing the one or more phases of the ETL process is to be stored, and
determining whether particular output data, related to the one or more standards, is present in the one or more data locations,
wherein the one or more standards indicate at least one of a particular type of output data be present in the one or more data locations, or a schema of the one or more data locations include particular fields, and
wherein the particular output data is associated with at least one of the particular type of output data, or the particular fields of the schema; and
transmit, based on whether the initialization or the execution of the one or more phases of the ETL process satisfies the one or more standards, a response indicating whether the code complies with the feature authoring library.

2. The system of claim 1, wherein the request is to validate the code for at least one of:
at the initialization of the one or more phases of the ETL process,
during the execution of the one or more phases of the ETL process, or
after the execution of the one or more phases of the ETL process.

3. The system of claim 1, wherein the request and the response are via an application programming interface.

4. The system of claim 1, wherein the set of definitions of the feature authoring library includes a definition of the feature.

5. The system of claim 1, wherein the code uses one or more customizations, of the feature authoring library, that are defined in the customization library.

6. The system of claim 1, wherein the feature authoring library is non-specific to the platform.

7. The system of claim 1, wherein the determination further comprises:
determining whether a test coverage percentage satisfies a test coverage percentage threshold value,
wherein the test coverage percentage is associated with a code quality check of the code defining the feature.

8. The system of claim 1, wherein the one or more standards indicate that a quantity of records used in a first phase of the ETL process and in a second phase of the ETL process match.

9. The system of claim 1, wherein the one or more standards is associated with determining whether information related to a data store where data is to be published, is included or not.

10. A method of validating code, comprising:
receiving, by a device, a request to validate code defining a feature for compliance with a feature authoring library,
wherein the code configures one or more phases of an extract, transform, and load (ETL) process associated with obtaining data for the feature;
identifying, by the device, one or more standards for assessing whether an initialization or an execution of the one or more phases of the ETL process is indicative of the code complying with the feature authoring library;
determining, by the device, whether the initialization or the execution of the one or more phases of the ETL process satisfies the one or more standards,
wherein the determination comprises:
accessing one or more data locations where output data from executing the one or more phases of the ETL process is to be stored, and
determining whether particular output data, related to the one or more standards, is present in the one or more data locations,
wherein the one or more standards indicate at least one of a particular type of output data be present in the one or more data locations, or a schema of the one or more data locations include particular fields, and
wherein the particular output data is associated with at least one of the particular type of output data, or the particular fields of the schema; and
transmitting, by the device and based on whether the initialization or the execution of the one or more phases of the ETL process satisfies the one or more standards, a response indicating whether the code complies with the feature authoring library.

11. The method of claim 10, wherein determining whether the initialization or the execution of the one or more phases of the ETL process satisfies the one or more standards comprises:
obtaining information that configures the initialization of the one or more phases of the ETL process; and
processing the information to determine whether the information indicates satisfaction of the one or more standards.

12. The method of claim 10, wherein determining whether the initialization or the execution of the one or more phases of the ETL process satisfies the one or more standards comprises:
obtaining information generated by the execution of the one or more phases of the ETL process; and
processing the information to determine whether the information indicates satisfaction of the one or more standards.

13. The method of claim 10, wherein determining whether the initialization or the execution of the one or more phases of the ETL process satisfies the one or more standards comprises:
- transmitting an application programming interface (API) request for information relating to the initialization or the execution of the one or more phases of the ETL process;
- receiving an API response indicating the information; and
- determining whether the information indicates satisfaction of the one or more standards.

14. The method of claim 10, wherein the request is from a computing infrastructure on which the initialization and the execution of the ETL process are to be performed.

15. The method of claim 10, wherein determining whether the initialization or the execution of the one or more phases of the ETL process satisfies the one or more standards comprises:
- scanning the one or more data locations to identify whether the output data is present in the one or more data locations.

16. A non-transitory computer-readable medium storing a set of instructions for validating code, the set of instructions comprising:
- one or more instructions that, when executed by one or more processors of a device, cause the device to:
  - determine whether an initialization or an execution of one or more phases of an extract, transform, and load (ETL) process satisfies one or more standards for assessing whether the initialization or the execution of the one or more phases of the ETL process is indicative of code complying with a feature authoring library,
    - wherein the code configures the one or more phases of the ETL process in connection with obtaining data for a feature, and
    - wherein the determination comprises:
      - accessing one or more data locations where output data from executing the one or more phases of the ETL process is to be stored, and
      - identifying whether particular output data, related to the one or more standards, is present in the one or more data locations,
        - wherein the one or more standards indicate at least one of a particular type of output data be present in the one or more data locations, or a schema of the one or more data locations include particular fields, and
        - wherein the particular output data is associated with at least one of the particular type of output data, or the particular fields of the schema; and
  - transmit, based on whether the initialization or the execution of the one or more phases of the ETL process satisfies the one or more standards, an indication of whether the code complies with the feature authoring library.

17. The non-transitory computer-readable medium of claim 16, wherein a standard, of the one or more standards, is that the feature authoring library is being used in the execution of the one or more phases of the ETL process.

18. The non-transitory computer-readable medium of claim 16, wherein the one or more instructions, that cause the device to determine whether the initialization or the execution of the one or more phases of the ETL process satisfies the one or more standards, cause the device to:
- obtain information that configures the initialization of the one or more phases of the ETL process; and
- process the information to determine whether the information indicates satisfaction of the one or more standards.

19. The non-transitory computer-readable medium of claim 16, wherein the one or more instructions, that cause the device to determine whether the initialization or the execution of the one or more phases of the ETL process satisfies the one or more standards, cause the device to:
- obtain information generated by the execution of the one or more phases of the ETL process; and
- process the information to determine whether the information indicates satisfaction of the one or more standards.

20. The non-transitory computer-readable medium of claim 16, wherein the one or more instructions, that cause the device to determine whether the initialization or the execution of the one or more phases of the ETL process satisfies the one or more standards, cause the device to:
- transmit an application programming interface (API) request for information relating to the initialization or the execution of the one or more phases of the ETL process;
- receive an API response indicating the information; and
- determine whether the information indicates satisfaction of the one or more standards.

* * * * *